US012056716B2

(12) United States Patent
Ravi (10) Patent No.: US 12,056,716 B2
(45) Date of Patent: Aug. 6, 2024

(54) SYSTEMS AND METHODS FOR ACCESSING DISTRIBUTED SERVICE SYSTEMS TO SURFACE INSIGHTS FOR A USER

(71) Applicant: Stripe, Inc., South San Francisco, CA (US)

(72) Inventor: Abishek Ravi, Seattle, WA (US)

(73) Assignee: STRIPE, INC., South San Francisco, CA (US)

( * ) Notice: Subject to any disclaimer, the term of this patent is extended or adjusted under 35 U.S.C. 154(b) by 190 days.

(21) Appl. No.: 17/714,907

(22) Filed: Apr. 6, 2022

(65) Prior Publication Data

US 2023/0325846 A1    Oct. 12, 2023

(51) Int. Cl.
*G06Q 30/00* (2023.01)
*G06F 9/451* (2018.01)
*G06Q 30/018* (2023.01)

(52) U.S. Cl.
CPC .......... *G06Q 30/018* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2014/0243017 A1* | 8/2014 | Das | H04W 4/021 455/456.2 |
| 2018/0191763 A1* | 7/2018 | Hillard | H04L 63/1416 |
| 2018/0367642 A1* | 12/2018 | Dou | H04L 41/5019 |
| 2019/0294485 A1* | 9/2019 | Kukreja | G06F 11/0772 |
| 2021/0011741 A1* | 1/2021 | Bartfai-Walcott | H04L 9/3247 |
| 2021/0081972 A1* | 3/2021 | Sahni | G06N 20/00 |
| 2022/0092468 A1* | 3/2022 | Mukherjee | G06F 21/85 |
| 2022/0229721 A1* | 7/2022 | Rossi | G06F 11/3476 |
| 2023/0292325 A1* | 9/2023 | Bai | H04L 5/0055 |

* cited by examiner

*Primary Examiner* — Matthew T Sittner
(74) *Attorney, Agent, or Firm* — Womble Bond Dickinson (US) LLP (57) ABSTRACT

A method and apparatus for leveraging a distributed services system for surfacing insights for a user are described. The method may include accessing, by a computer processing system, service system data generated for a user by services of a distributed service system, the service system data including one or more values associated with one or more corresponding common entities in a data store of disambiguated service system data. The method may also include inputting the one or more values associated with the one or more corresponding common entities generated for the user into a trained machine learning model (MLM), the machine learning model trained to detect an effect of the one or more values associated with the one or more corresponding common entities on a set of metrics of interest. Furthermore, the method may include detecting, by the MLM, when there is an anomaly in a metric of interest in the set of metrics of interest.

19 Claims, 5 Drawing Sheets

SYSTEMS AND METHODS FOR ACCESSING DISTRIBUTED SERVICE SYSTEMS TO SURFACE INSIGHTS FOR A USER

BACKGROUND

Merchants, such as grocers, car services, online marketplaces, etc., provide their products and services to consumers. Such merchants may employ agents to deliver their products and/or provide the actual services to the merchant's customers, provide digital goods directly to their customers, or ship physical goods to consumers. For example, a person acting on the merchant's behalf will drive a consumer in their own car, deliver food ordered through a merchant website, pick up and/or drop off clothes dry cleaned by the merchant, etc. As another example, merchants may provide a website, online marketplace, etc., to sell digital products, such as music, documents, art, unique tokens, etc., to consumers. As another example, merchants may provide resources to consumers, such as providing remote storage solutions, remote processing, virtual computing resources, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the transactions. Instead, merchants utilize a commerce platform to process financial transactions for the products and/or services provided to consumers. Such commerce platform may provide their transaction processing services to the merchant by way of software applications, web pages, application programming interfaces (APIs), etc. The merchant system integrates the commerce platform's software, APIs, web pages, etc. into the merchant interfaces to handle the processing of consumer transactions. Once integrated, the commerce platform, on behalf of the merchant system, can perform processing of payments for goods or services including collecting credit card information, running credit cards, crediting a merchant account for the transaction, crediting agents responsible for the transaction, debiting a commerce platform fee for processing the transaction on behalf of the merchant, interacting with authorization network systems (e.g., bank systems, credit card issuing systems, etc.), providing payouts for products/services rendered on behalf of the merchant, as well as other.

The commerce platform may further provide additional services to merchants, such as managing or tracking physical resource usage, extending credit, offering loans, managing stock units, forming corporations, performing tax services, performing accounting services, etc. as software services extended to the merchants. With the expansion in such service offerings, commerce platforms are increasingly using distributed computing techniques to provide their various products and services to end users. Such distributed computing techniques often involve the distribution of tasks performed by different physical computing resources that communicate with one another via a computing network. The distributed physical computing resources utilize network-based communication to exchange messaging that support each physical machine's functions and/or the functions of other machines within the distributed computing environment to complete an overall operation through a collection of distributed tasks. Thus, the collection of distributed physical computing resources cooperate to provide the commerce platform's products and services to their end users.

One approach to a commerce platform utilizing distributed computing systems is to represent different concepts and/or resources as distinct services, where distinct services each have their own distinct processing resources and data storage within the distributed computing environment. Then, service-to-service network calls provide information transfer, requests for support services (e.g., where a service performs some function for another service), responses (e.g., a result of one service performing a requested function), etc. to support the various operations, services, and products of the organization.

While the distribution of concepts and/or resources as distinct services processed by distinct systems is helpful in developing, maintaining and then providing multiple services by an organization to end users, the organization's ability to utilize the distributed data maintained across various services to provide insights to a user of the distributed system represents several technical challenges.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "parsing", "disambiguating", "storing", "training", "inputting", "determining", "generating", "adding", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Figure 1:
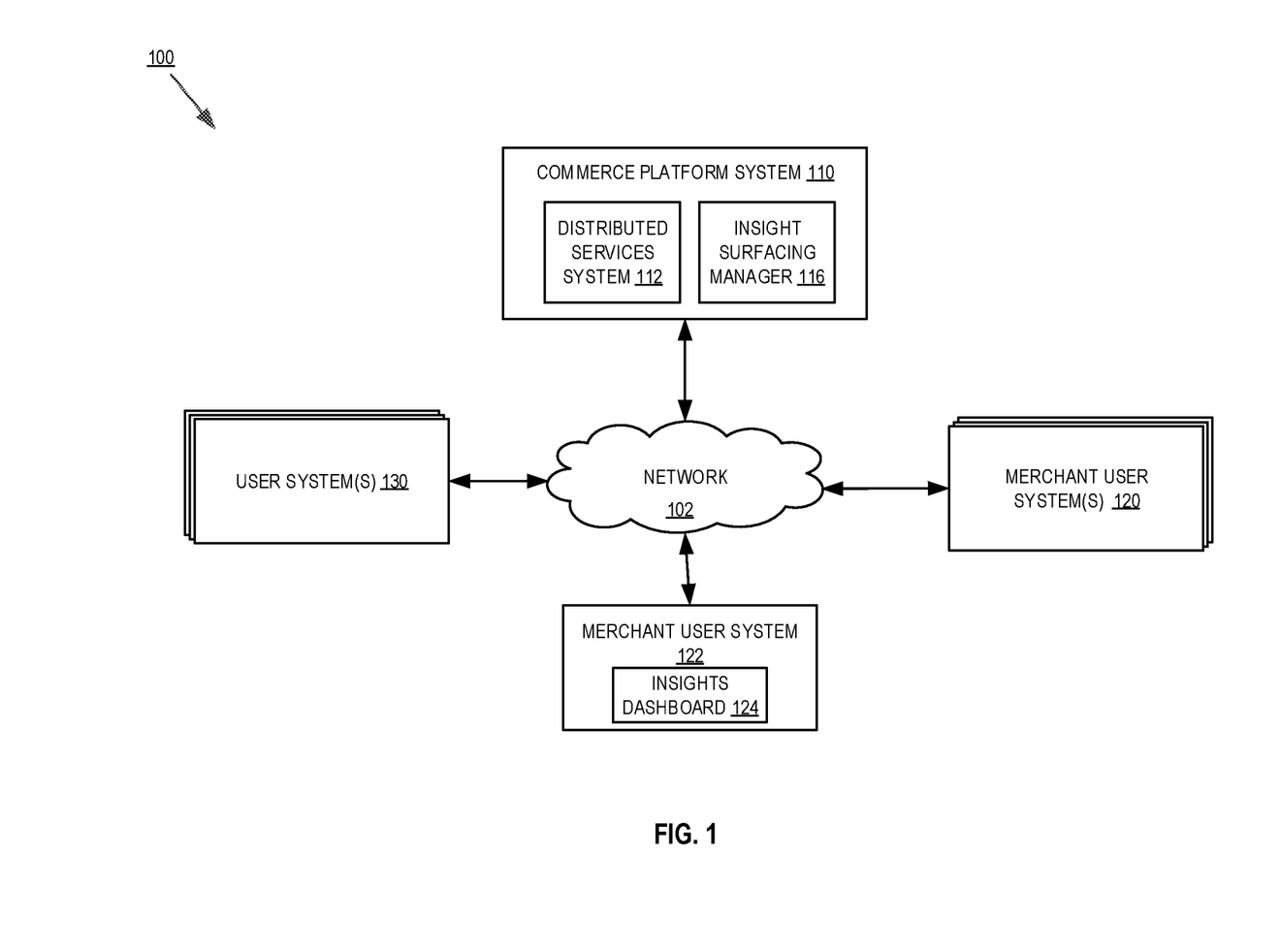
FIG. 1 is a block diagram of an exemplary system architecture for a commerce platform system leveraging a distributed services system for surfacing insights for a user.

FIG. 1 is a block diagram of an exemplary system architecture 100 for a commerce platform system 110 leveraging a distributed services system 112 for surfacing insights for a user, such as user(s) of merchant user system 122.

In one embodiment, the system 100 includes commerce platform system 110, one or more merchant user system(s) 120 and 122, and one or more user system(s) 130. In one embodiment, one or more systems (e.g., system 120, 122, and 130) may be mobile computing devices, such as a smartphone, tablet computer, smartwatch, etc., as well computer systems, such as a desktop computer system, laptop computer system, server computer systems, etc. The commerce platform system 110 and merchant user system(s) 120 and 122 may also be one or more computing devices, such as one or more server computer systems, desktop computer systems, etc. that utilize distributed computing architectures.

The commerce platform system 110, merchant user system(s) 120 and 122, and user system(s) 130 may be coupled to a network 102 and communicate with one another using any of the standard protocols for the exchange of information, including secure communication protocols. In one embodiment, one or more of the commerce platform system 110, merchant user system(s) 120 and 122, and user system(s) 130 may run on one Local Area Network (LAN) and may be incorporated into the same physical or logical system, or different physical or logical systems. Alternatively, the commerce platform system 110, merchant user system(s) 120 and 122, and user system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides various services to one or more systems, such as to merchant user system(s) 120, merchant user system 122, and/or user system(s) 130. For example, commerce platform system 110 may provide an array of services that assist merchant user system(s), such as processing transactions for merchant user system(s) initiated at user system(s) 130 and/or merchant user system(s) 120 and/or 122, performing tax services for merchant user system(s), performing accounting services for merchant user system(s), performing investing services for merchant user system(s), performing inventory management services for merchant user system(s), as well as other services typically associated with commerce platforms systems such as, for example, STRIPE™.

In an embodiment, each of these services is performed by a different service system of the distributed services system 112. That is, each service of the distributed service system 112 has its own processing resources, software resources, data storage, etc. for performing the functions/tasks of that service. These services are independent in that they perform their associated service, and may exchange messaging with other services as needed for completion of their services. Because each service is responsible for completing the functions of that service, each service stores merchant user system(s) 120 and user system(s) 130 data for the services being performed. For example, an invoicing service may store invoicing records for merchants, while a payments processing service stores transaction records, and while a stock keeping service stored data related to current stock, purchases impacting, stock etc. Furthermore, each service may communicate with other services to facilitate the functions of a service (e.g., a payments service may communicate relevant payments data to tax and/or accounting services, an invoices service may communicate with an inventory service, etc.).

For commerce platform systems that operate at scale, such as system 110, the number of transactions on the magnitude of millions or billions of transactions are processed each hour, day, month, etc. by the distributed services systems 112 for a plurality of merchant user system(s) 120 and 122, and user system(s) 130. Each of these transactions is therefore processed by the associated service(s) of the distributed services systems 112, and data associated with the transactions are stored service data stores. Thus, a rich source of data for all facets of merchant user system(s)' businesses is maintained for merchants of different sizes, merchants having different core businesses, merchants located at or serving different locations, etc. across the distributed service system 112 of the commerce platforms system. How to locate, combine data having disparate electronic descriptors, and then use this wealth of information is therefore a technical problem that arises as a result of the modern distributed services computing environment employed by the commerce platform system 110.

Commerce platform system(s) 110, in embodiments leverages the various data (e.g., transaction, accounting, taxes, corporation formation, stock management, allocation for hardware resources, etc.) generated for each merchant user system across services to surface insights that improve how a given merchant user system performs. As will be discussed herein, for example, successful cohort level businesses (e.g., businesses of a similar size, similar industry, similar location, and/or a combination of such factors) may allocate a certain number of processing resources on a seasonal basis, which may not be done by a particular merchant user system. The successful nature of the business may be based on service system data maintained by the commerce platforms system, such as volume of sales exceeding other cohort or non-cohort levels, rate of stock turnover being faster than cohort or non-cohort rates, tax return information related to profitability, accounting information related to net profit, etc. Thus, providing insight(s) to a merchant user system by determining what other merchant systems are successful and why they are successful, and in embodiments adjusting resource allocation of the particular merchant user system to match those of the successful cohort merchant user systems, enables an improvement (e.g., improved resource utilization, decreased downtime, decreased response times, improved profitability, etc.) for the merchant user system's resource utilization, allocation, potential profitability, etc. That is, in embodiments commerce platform 110 uses its unique position within the modern network based transaction processing environment that provides software as a service and the data it generates from the various services, as well as its functions performed by distributed systems that each provide and/or support the various service of the commerce platform 110, to generate a new approach and improved solutions to recommending how a particular merchant may adjust service usage at the commerce platform system, as well as outside the commerce platform system, to improve and/or maintain goals of a particular merchant system.

As discussed herein, insight surfacing manager 116 of the commerce platform system 110 utilizes the wealth of data stored across the services of the distributed service system 110 to surface insights relevant to a particular merchant user system 122. In particular, the data generated by the services of the distributed services system 112 for the merchant user system(s) 120 and merchant user system 122 are stored by each service of the distributed services system 112. The data, as discussed herein can include transaction processing data managed by a transaction service, tax data managed by a tax service, inventory/stock data managed by an inventory service, invoice data managed by an invoice service, as well as other data managed by other services as used by the various merchant user systems.

Insight surfacing manager 116 accesses the various service system data stores, and parses the data to extract data descriptors and data values associated with the data descriptors. For example, an invoice service may store an invoice listing a cloud service allocation cost with the requested processing/storage allocation(s). The insight surfacing manager 116 extracts these data descriptions and their associated values as data relevant to resource utilization and cost. Then, because different invoices and/or merchant user system(s) may user different wording, descriptors, etc., data disambiguation is performed on the extracted data descriptors to map or translates the data descriptors to common entities. For example, a first merchant system may have an invoice listing a spend amount on total processing allocation, and a second merchant user system may have an invoice listing a cost of cloud processing allocation. Parsing, data descriptor extraction, and then mapping enables the cost/spend (e.g., the associated value) to be stored in a common entity (e.g., remote computing resources). When such parsing, extracting, and then mapping/translating is performed on various data across services and merchant user systems, a corpus of data is generated that uses common entities and stores associated values for those entities for each merchant user system. Furthermore, insights may go beyond the services of the commerce platform system 110, such as when, for example, an insight relates to services outside of the commerce platform system 110, but which can be gleaned from service system data generated within the commerce platform system 110.

Furthermore, to maintain privacy of merchant systems' data, the entity and value data may be stripped of identification data (e.g., merchant name, merchant ID, or other identifiers) prior to storage, or prior to distribution and reporting to a particular merchant user system. Thus, data is accessed from various services, extracted from the service system data, normalized into a common entity naming scheme with associated value, and then stored in a data store. The accessing, parsing, and mapping of data descriptors to common entities may be periodically repeated to grow the data store and/or reflect real world and real time changes in values of certain entities. For example, during a holiday, certain inventory data, cloud spend allocation data, etc. may rise, and providing such trend data to a merchant user system that does not make these increases during the holiday season can help that merchant user system improve their business. As another example, during a certain time of year, cohort businesses of a certain merchant user system decrease cloud computing storage and processing resources, and providing such trend data to a merchant user system that does not make these decreases during the time of year can help that merchant user system improve physical computing utilization and decrease costs. As yet another example, additional non-seasonal/non-trend based data insights can be derived from global patterns and aggregated statistics at a cohort level. In this example, insights can be generated and presented by determining for cohorts based on one set for factors other sets of factors related to metrics of interest (e.g., cohorts with a similar number of customers and payment processing volume (i.e., relevant cohorts), tend to spend 10%-15% lesser on invoice costs (i.e., metric of interest) by employing techniques like X, Y, and Z within the merchant business (i.e., insights)).

To surface such insights and make such recommendations, in an embodiment, insight surfacing manager 116 utilizes the corpus of disambiguated and potentially anonymized entities and values to train a machine learning model (MLM) that performs trend analysis accounting for seasonality, cohort size, and locality. Such an MLM may be, for example, the PROPHET™ machine learning model used to forecast trends with seasonality for cohorts with/without locality, a temporal fusion transformer machine learning model that performs forecasting with analyst in the loop, as well as other machine learning model based forecasting. In particular, a set of key metrics may be defined, such as a desired cloud computing spending cost to usage ratio, a tax liability threshold, an inventory overhead value, a maximum number of inventor units, shipping cost averages, or any other metric that may indicate a successful business outcome. Then, a set of entities and values stored by insight surfacing manager 116 can be defined as inputs to the MLM, and input to the MLM in a training phase of the MLM so that the MLM can detect, for example, entities and values having an impact on different key metrics, and how entities and values may contribute to a positive or negative impact on the key metric in general, with seasonality, for cohort merchant user systems, for merchants at similar locations, trending over time, or a combination.

In embodiments, the MLM is therefore trained to detect entities and values that, when during a usage phase of the MLM, have a significant impact on one or more key metrics from a set of input metrics (e.g., input entities and values). In other words, the corpus of disambiguated and anonymized merchant user system data is able to train the MLM to relate the various entity/value inputs to the key metrics. In an embodiment, when a key metric value of a given merchant is anomalous (e.g., not within a threshold amount of cohort or non-cohort businesses), the MLM detects this deviation and can output the entities and values that have the greatest impact on the deviation. In another embodiment, when a direction of movement of a key metric is defined as positive (or alternatively negative), the MLM's trend forecasting can receive as input specific user data sets in order to determine the user's data's relationship to the key metric relative to the direction of interest by detecting which user data is anomalous causing the merchant user to deviate from a positive trend or follow a negative trend (e.g., entities and values that have a significant impact on stock being too high, shipping costs being too low, cloud spend too high, not a sufficient number of servers, etc., as well as indicating entities and values that have a significant impact on positive factors such as overhead being in line with successful cohorts, increasing inventory at a correct time, allocating sufficient resources at a specific time of year, etc.). In other words, the MLM leverages the corpus of merchant user system data to enable the MLM to detect what entities and values associated with specific user merchant system's service usage are consistent with positive trends and/or outcomes, are outside of defined thresholds, etc. and which entities and values associated with a user merchant system's service usage contribute to a negative or suboptimal service system usage.

In an embodiment, the insight surfacing manager 116, following MLM analysis of the merchant user system's 122 service system data generates an insights dashboard 124 for rendering at merchant user system 122. The insights dashboard 124 is a graphical user interface (e.g., webpage, data to populate a mobile or other application, etc.) that displays the entities and values detected by the insights manager that contribute to successfully obtaining positive key metrics and/or contribute to not obtaining key metrics. Furthermore, these insights, which are surface by the MLM and the insight surfacing manager's unique access to the distributed service system data, may be filtered or tuned for a specific merchant user system 122 based on locality, cohort size, or other factors relevant to the particular merchant user system 122.

In one embodiment, insight surfacing manager 116 may further take an affirmative action and/or suggest an affirmative change in a service system usage upon detecting an anomaly in one or more merchant user system entity/values that cause a deviation in a key metric. For example, if a cloud spend cost extracted from invoicing service system data is determined to be too high based on the MLM analysis by insight surfacing manager 116, the insight surfacing manager 116 may suggest via the insights dashboard that the cloud computing spend by the merchant associated with the merchant user system 122 be reduced. In an embodiment, where commerce platform system 110 includes a service for management of cloud service acquisition (e.g., resource allocation, distribution, etc.) for the merchant user system 122, the insight surfacing manager 116 may automatically adjust the value of the entity for the relevant service so that the merchant user system's 122 usage would meet the key metric, where the value and entities to be adjusted are determined by the MLM as those leading to the anomalous result and the adjustment based on how the values deviate. For example, an inventory level on a specific item may be too high given a location and season associated with merchant system 122, when compared to other merchant user systems. In this example, if merchant user system 122 uses a service of the distributed services system 112 to manage inventory levels, the service could be informed by the insight surfacing manager 116 as to a change using the entity/values causing the anomalous results. Furthermore, the insights surfacing manager is able to surface insights that may be seeming unrelated, such as for example, such as showing how inventory unit levels impact cloud spend.

Thus, in the embodiments discussed herein, insights surfacing manager 116 is enabled to detect specific data that is causing a merchant user system not to obtain one or more key metric(s) (e.g., stock level, profitability, shipping cost average, cloud spend, resource usage, etc.) to then enable the merchant system to take action to correct the entity/values causing the issue by providing the determined insights in a dashboard user interface. Furthermore, in some embodiments, the insight surfacing manager 116 may automatically adjust values of entities to alter the services of commerce platform on the merchant user system's behalf.

Figure 2:
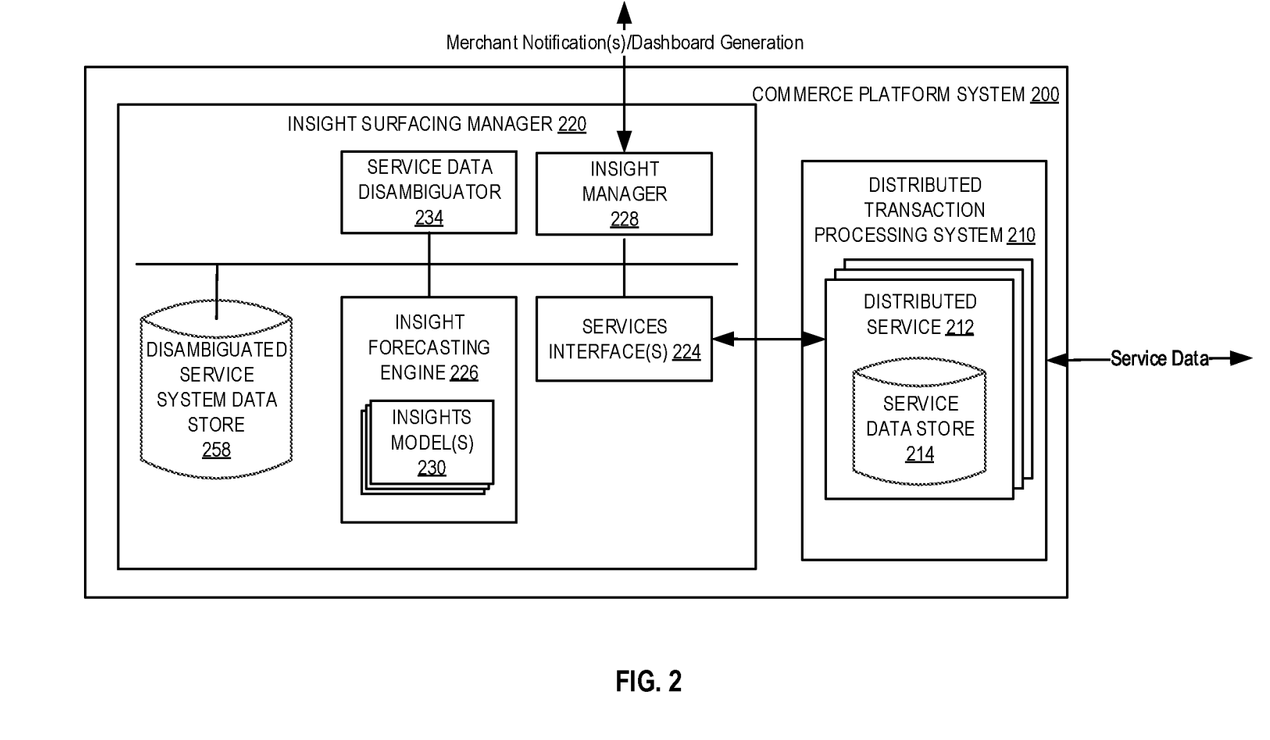
FIG. 2 is a block diagram of one embodiment of an insight surfacing manager of a commerce platform system.

FIG. 2 is a block diagram of one embodiment of an insight surfacing manager 220 of a commerce platform system 200. Commerce platform system 200 and insight surfacing manager 220 provide additional details for the commerce platform system 110 and insight surfacing manager 116 discussed above in FIG. 1.

In one embodiment, commerce platform 200 includes a distributed transaction processing system 210. The distributed transaction processing system 210 includes a plurality of different distributed services 212 each having their own service data store 214. Furthermore, although not shown the distributed services 212 each have their own processing resources. Thus, the distributed services 212 may be separate and remote from one another, and are therefore responsible for maintaining their own service system data in their own data stores 214 for the services provided to merchant user systems (e.g., merchant user systems 120 and 122). In embodiments, the distributed services 212 of the distributed transaction processing system 210 are responsible for providing the various services of the commerce platform system 200 (e.g., payments processing, tax, accounting, inventory, invoicing, subscriptions, etc.,) over a communications network (e.g., network 102) to merchant user systems and their customers.

Insight surfacing manager 220, in an embodiment, may also be a distributed service that communicates via a communications network with the other distribute services 212. In embodiments, insight surfacing manager 220 includes a services interface(s) 224 that is responsible for communicating with each of the distributed service(s) 212. To this end, services interface(s) 224 may employ application programming interface (API) based messaging to communicate with the services via service system endpoints. However, other communication techniques, such as standardized messaging (e.g., UDP, TCP, HTTP, HTTPS, etc.), usage of distributed software libraries, etc. may be utilized by the service interface(s) 224. Services interface(s) therefore periodically access the service system data maintained within the service data store 214 of each distributed service 212.

Service data disambiguator 234 is responsible for extracting data descriptors and associated data values, and translating the accessed user data into common entities associated with the associated data values. In embodiments, a parser is an application within service data disambiguator configured to locate text, data fields, metadata, or other specific data within the accessed service system data to locate data descriptors associated with metrics of interest. That is, the parser may locate various terms, words, values, phrases, etc. associated with a set of data that is to be used by the insight forecasting engine 226 as machine learning model inputs (e.g., a set of data input into insights model(s) 230) and/or metrics of interest (e.g., key metrics that are used as indicators of successful business practices). The parsed information is then translated, such as using a dictionary, mapping table, or other rules to translate the extracted data descriptors to common entities and their associated values. Thus, the data of various sources, even if stored with different data descriptors, is parsed and translated into common entities and values, so that the data used to train the insights model(s) 230 is normalized across the distributed services and different merchant systems. The data translated to comment entities and values are then stored in disambiguated service system data store 258, along with various metadata indicating business location, size, industry, time of storage, etc. In some embodiments, the disambiguated entities and values may be stripped of merchant user system identification data, but retain cohort identification data (e.g., merchant size, merchant location, merchant core business, etc.). However, in other embodiments, such identification data is retained, until report generation, so that insights may be given anonymously, but merchant user system data is identifiable as input the insights model(s) 230, as discussed below.

Insight forecasting engine 226 is responsible for periodically accessing the disambiguated data from disambiguated service system data store 258. The accessed data is organized into a set of inputs into one or more insights model(s) 230 during a training phase of those model(s). For example, the model(s) may be the PROPHET™ model, a temporal fusion transformer model, or a combination of models, where the inputs train the model using MLM training techniques to detect trends in key metrics from the input data with seasonality, cohort size, location, industry, or a combination of such factors. In an embodiment, the key metrics is also a set of data that are associated with having a successful business, such as overhead levels, stock turnover, cloud services spend, net profit, minimal tax liability, etc. Any number and type of key metrics may be chosen for insights model(s) 230 to analyze and determine which input(s) have a statistically significant impact on meeting a trend and/or deviating from the trend.

In an embodiment, insight forecasting manager 226 then periodically, such as at a regular interval (e.g., weekly, monthly, quarterly, etc.) or upon merchant user system request via an insights dashboard user interface, accesses a set of merchant user system data consistent with at least a portion of the inputs to the insights model(s) 230. The merchant user system data may be obtained by request sent to services interface(s) 224 to obtain the specific merchant user system data from service system data stores 214. Furthermore, in embodiments, the obtained data may be parsed, and translated, as discussed above into common entities and associated values. Then, the merchant user system data, once translated, is input into the trained insights model(s) 230. However, in other embodiments, the merchant user system data may be accessed in data store 258. The output of the models 230 may include the detection of the merchant user system following a trend, deviating from a trend, and/or a combination thereof, as well as the data inputs (e.g., entities and values) that have a significant impact on the trend. Trend, as discussed herein, may include a change in value over a set time (e.g., increased profit, decreased resource allocation, etc.), as well as maintaining a value over a set time (e.g., maintaining net profit above 10%, maintaining an advertising budget of X % of gross receipts, etc.). The trend, however, is associated with a positive business practice (e.g., a trend related to fast inventory turnover, a trend related to increased orders, a trend related to cloud resource allocation matching resource utilization, etc.). In an embodiment, the insights model(s) 230 are trained to detect entity/value data (or combinations of data) leading to an anomaly. In embodiments, an anomaly is a one or more values of user data causing a statistically significant deviation from a trend of a metric of interest (e.g., deviation being movement in a positive or negative direction).

Insight manger 228 is responsible for accessing the output of the insights model(s) 230, an reporting detected anomalies to a merchant user system. In an embodiment, one or more of notifications, including notification messages (e.g., email, text, MMS, etc.) and/or dashboard user interface notifications are generated by insight manager when the output of the insights model(s) 230 detects one or more anomalies. The one or more notifications may include, for example, an identification of the anomaly (e.g., statistically significant deviation from a trend in either a positive or negative direction), and the value(s) of merchant user system data causing the anomaly. In embodiments, insight manger 228 may also include one or more notifications of a merchant user system meeting a trend, and the data inputs having a most significant impact on that trend. By including the detected anomaly and the data causing the anomaly, as well as detected trend matching and data impacting that trend, a merchant user system receiving the data not only in informed of what they are doing well (e.g., matching a trend or beating a trend), they are also informed what they could improve on. In an embodiment, the data causing the anomaly can further include the deviation from general and/or cohort merchant user systems (e.g., how the specific merchant user system's data causes the anomaly, such as being greater than or less than cohort level data). By knowing how user system data values are leading to an anomaly, in embodiments, the insight manager 228 is able to inform the merchant user system how to adjust their data to be in light with successful cohorts (e.g., adjust the data values leading to the anomalies).

Furthermore, in an embodiment, insight manager 228 may adjust a service of the distributed service 212 to adjust a merchant user system's anomaly causing data values to avoid causing the anomaly. That, is the values of certain service system data (e.g., accounting values, stock values, shipping costs, cloud data spend, etc.) may be adjusted to be in line with other successful businesses. This adjustment may be made automatically by insight manager 228, or upon request by a user of merchant user system (e.g., within a dashboard user interface).

Therefore, as discussed above, insight surfacing manager 220 is able to detect specific data values and entities associated with a merchant user system's usage of distributed services that cause alignment with other successful businesses and business practices, and/or specific data values and entities causing statistically significant deviation from other successful businesses and business practices. The insight surfacing manager 220 is able to gain such insights by leveraging data generated using distributed computing environment of the commerce platform system 200, and then applying tools such as the MLM base insights model(s) 230.

Figure 3:
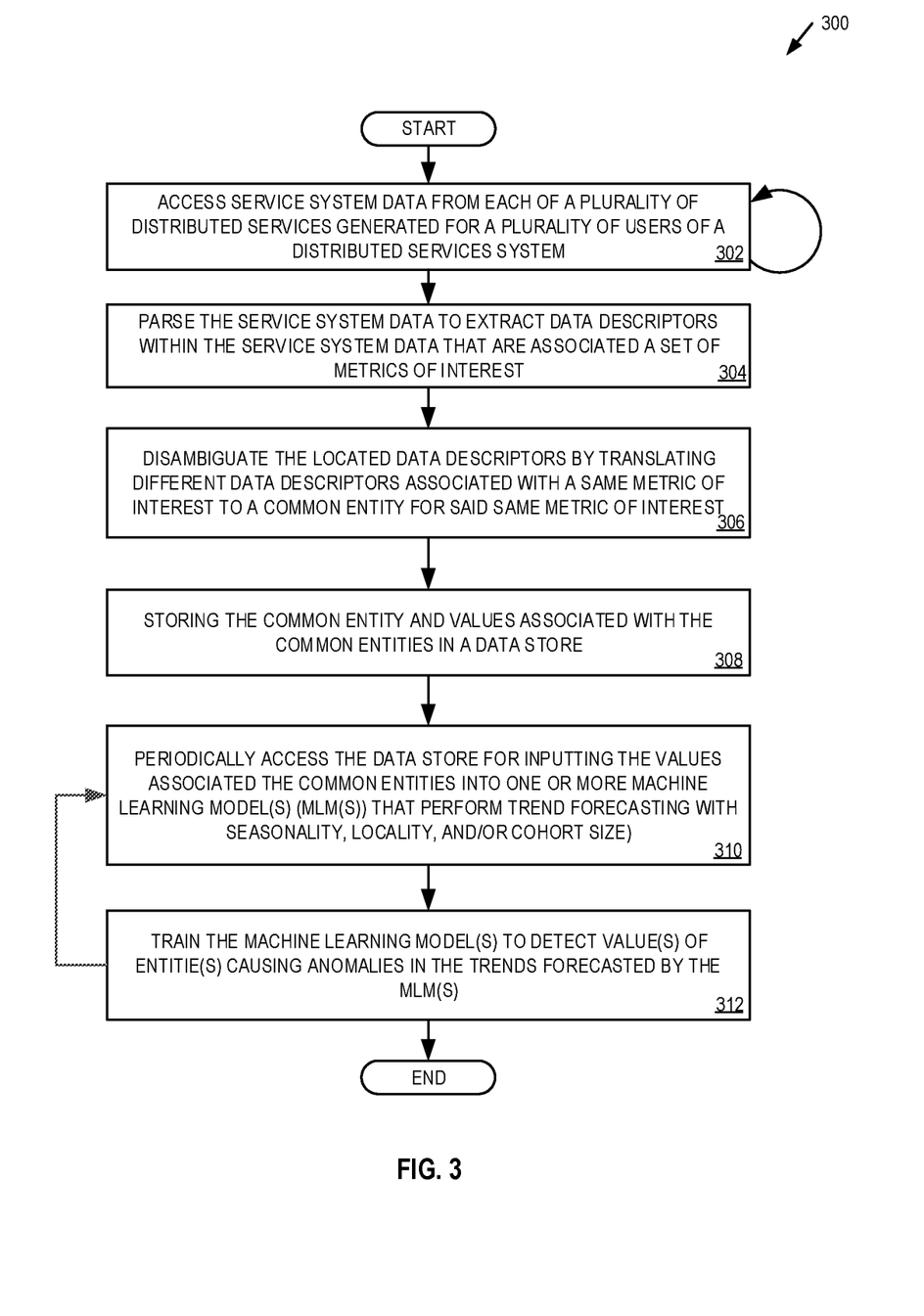
FIG. 3 is a block diagram of one embodiment of a method for performing data access and usage in a distributed processing environment of a commerce platform system for training an insights machine learning model.

FIG. 3 is a block diagram of one embodiment of a method 300 for performing data access and usage in a distributed processing environment of a commerce platform system for training an insights machine learning model. The method 300 is performed by processing logic that may comprise hardware (circuitry, dedicated logic, etc.), software (such as is run on a general purpose computer system or a dedicated machine), firmware, or a combination. In one embodiment, the method 300 is performed by an insight surfacing manager of a commerce platform system (e.g., insight surfacing manager 116 or 220, and commerce platform system 110 or 200).

Referring to FIG. 3, processing logic begins by periodically accessing service system data from each of a plurality of users of a distributed services system (processing block 302). As discussed here, processing logic may access the service system data by exchanging network based messaging (e.g., API, software library, standardized messaging, etc.) to access the data stores at each of a plurality of different distributed services.

Processing logic then parses the service system data to extract data descriptors within the service system data that are associated a set of metrics of interest (processing block 304). The obtained data is parsed to locate words, phrases, or other descriptors of interest and their associated values. In embodiments, a dictionary or other set of data may be predefined to locate the descriptors of interest. Furthermore, the descriptors are of interest when they relate to metrics that will be used as input into MLM insight model(s), key metrics being tracked, or both.

Processing logic then disambiguates the located data descriptors by translating different data descriptors associated with a same metric of interest to a common entity for said same metric of interest (processing block 306). The parsed data descriptors and associated values may be specific to each service and/or merchant user system generating the data. That is, for example, a merchant user system using an invoicing service may have invoices for cloud services, but the descriptions within the data (e.g., metadata) may be different. For example, one merchant's invoice may describe cloud spend, and another merchant user system may describe remote processing allocation. In an embodiment, the translating maps the different data descriptors associated with the same concept to a common entity and assigns the associated value to the mapped entity. By doing this, data from various users despite different sources, descriptors, etc. is mapped to a set of common entities. Processing logic stores the common entity and values associated with the common entities in a data store (processing block 308).

Then, processing logic periodically access the data store for inputting the values associated the common entities into one or more machine learning model(s) (MLM(s)) that perform trend forecasting with seasonality, locality, and/or cohort size) (processing block 310). Processing logic uses the input to train the machine learning model(s) to detect value(s) of entitie(s) causing anomalies in the trends forecasted by the MLM(s) (processing block 312). That is, a training phase is achieved by feeding training data in the MLM(s) (block 310) and performing the training operations (block 312) as a loop while training data is available. The MLM(s) may include a single model or a combination of models, which based on the training, recognize when a set of input data cause an anomaly in one or more metrics of interest. The metrics of interest, as discussed herein, are data indicative of positive business practices, and anomalies statistically significant deviations in one or more of the metrics of interest (as detected by the MLM(s)). Then, as discussed herein, the input value(s) and associated entities having an impact on the anomaly(s) can be determined to locate specific values that a merchant can improve upon. Furthermore, if a metric of interest is satisfied by a merchant user system's input, then the merchant may be informed of the values having a significant impact on meeting that trend.

Figure 4:
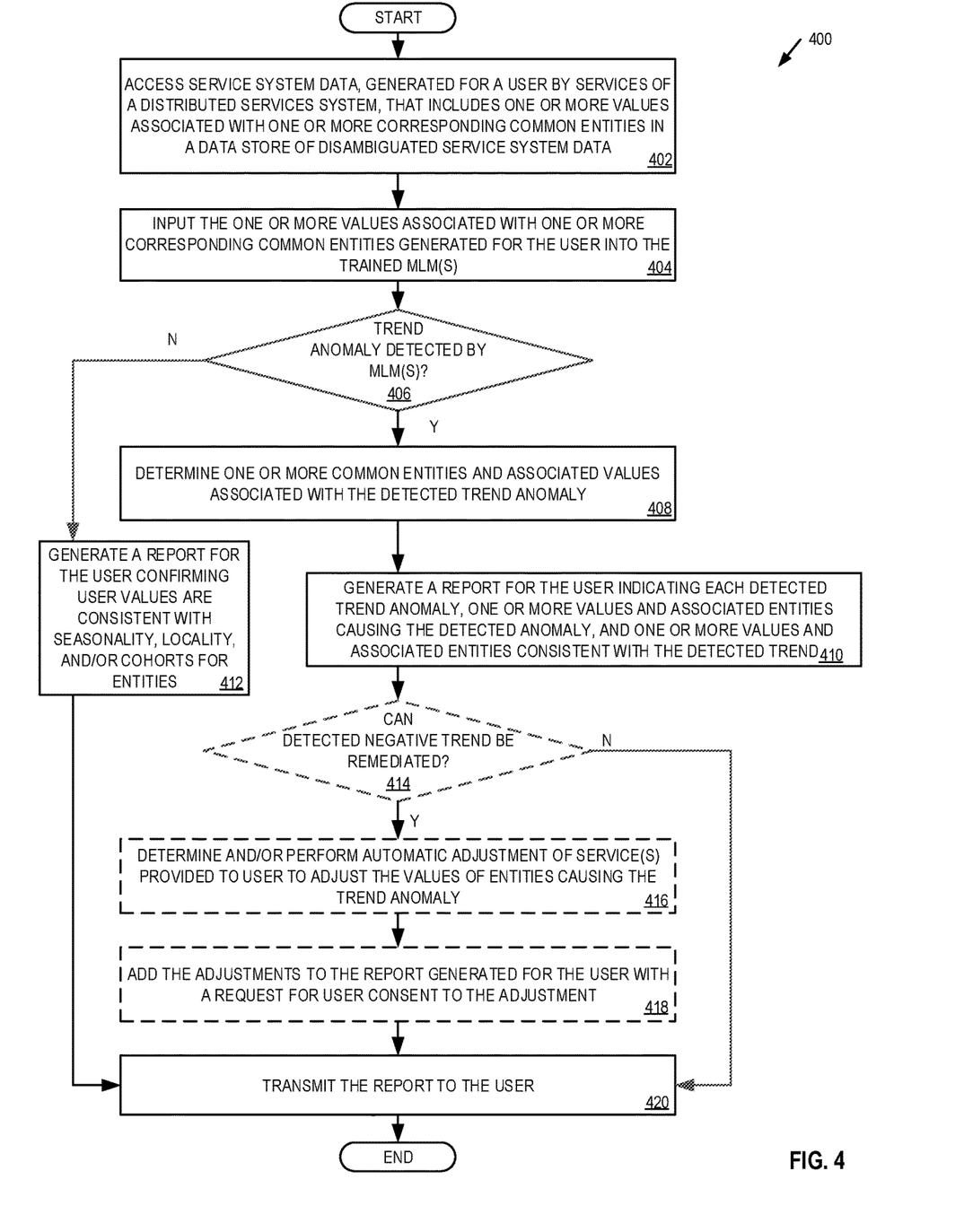
FIG. 4 is a block diagram of one embodiment of a method for using a machine learning model to generate insights of a user of a commerce platform system.

FIG. 4 is a block diagram of one embodiment of a method for using a machine learning model to generate insights of a user of a commerce platform system. The method 400 is performed by processing logic that may comprise hardware (circuitry, dedicated logic, etc.), software (such as is run on a general purpose computer system or a dedicated machine), firmware, or a combination. In one embodiment, the method 400 is performed by an insight surfacing manager of a commerce platform system (e.g., insight surfacing manager 116 or 220, and commerce platform system 110 or 200).

Referring to FIG. 4, processing logic begins by accessing service system data, generated for a user by services of a distributed service system, that includes one or more values associated with one or more corresponding common entities in a data store of disambiguated service system data (processing block 402). In embodiments, the disambiguated data for a user may be that generated by FIG. 3 and stored in the data store of disambiguated data. In another embodiment, data for a specific user is requested from distributed services, and then disambiguated according to processing block 302-308 of FIG. 3. Alternatively, identification data associated with the user enables appropriate merchant user data to be accessed within the disambiguated data store.

Processing logic inputs the one or more values associated with one or more corresponding common entities generated for the user into the trained MLM(s) (processing block 404). The trained MLM(s) may include a single model trained to perform trend analysis for any merchant system (e.g., regardless of merchant size, location, area of business, etc.), or may include cohort specific models. In either embodiment, inputting the one or more values enables the trained MLM(s) to detect whether there are anomaly(s) in trends (processing block 406). A single anomaly may be detected by processing logic, as well as multiple anomalies.

When no trend anomaly(s) are detected (processing block 406). Processing logic generates a report for the user confirming user values are consistent with seasonality, locality, and/or cohorts for entities (processing block 412). That is, for metrics of interest, a merchant user agrees with those metrics, and their business practices can be confirmed. In embodiments, the report is delivered to a user via one or more electronic messages, a dashboard user interface, data populating an application running on a merchant user system, or a combination (processing block 420).

However, when at least one trend anomaly is detected, a deviation from trends associated with key metrics of interest has been detected, and the values that have a statistically significant impact on the deviation can be determined by the MLM(s) (processing block 406). In embodiments, one or more common entities and associated values associated with the detected trend anomaly are determined (processing block 408). A report is generated for the user indicating each detected trend anomaly, one or more values and associated entities causing the detected anomaly, and one or more values and associated entities consistent with the detected trend (processing block 410). In embodiments, a reverse translation may be performed on the common entities to transform the common entity back to the original data descriptor.

In an optional embodiment, as indicate by dashed line, processing logic further determines whether a detected negative trend can be remediated (processing block 414). That is, a detected negative trend from blocks 406 and 408 may detect the trend and the entities/values impacting that trend. Then, if those entities/values are associated with distributed services of the service provider system, it may be possible to adjust the values, and thus the services, to align a user with a trend. For example, it may be determined that cloud spend is decreased at a certain time of year leading to increased profit for cohort level merchants. If a merchant fails to decrease cloud spend, and engages the cloud computing services via the distributed services of the commerce platform system, then the negative trend can be remediated by decreasing cloud spend within the distributed services.

Processing logic can accordingly determine and/or perform automatic adjustment of service(s) provided to user to adjust the values of entities causing the trend anomaly when the negative trend can be remediated (processing block 416). The adjustments can be added to the report generated for the user with a request for user consent to the adjustment (processing block 418). In embodiments, the adjustments added to the report may include recommendations, such as "It is suggested that you increase inventory by 10%", "Other cohort level businesses reduce cloud spend by 20% in March", etc. Furthermore, when such recommendations may be performed by a distributed service of a commerce platform, the report may further seek authorization (e.g., click here to make the adjustment, the adjustment will be made unless you opt out, etc.). However, in embodiments, block 418 may be omitted if a user has pre-authorized automatic remediation.

Processing logic then transmits the report (generated at block 410 and/or as augmented at block 418) to the user.

Figure 5:
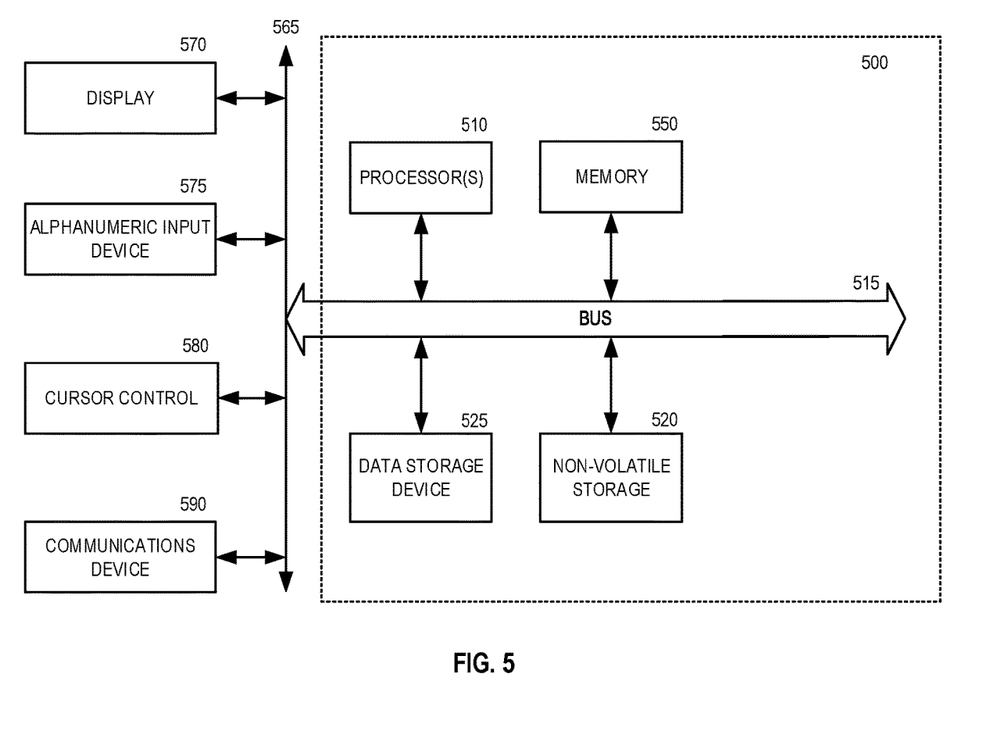
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant user system, a user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for leveraging a distributed services system for surfacing insights for a user, comprising:
   accessing, by a computer processing system, service system data generated for a user by services of a distributed service system of the computer processing system, the service system data comprising one or more values associated with one or more corresponding common entities in a data store of disambiguated service system data;
   inputting the one or more values associated with the one or more corresponding common entities generated for the user into a trained machine learning model (MLM), the MLM trained to detect an effect of the one or more values associated with the one or more corresponding common entities on a set of metrics of interest;
   detecting, by the MLM, when there is an anomaly in a metric of interest in the set of metrics of interest comprising:
      identifying, by the computer processing system, at least one entity and an associated value of the at least one entity determined by the MLM to cause the anomaly in the metric of interest,
      detecting, by the MLM, a deviation in a trend of values associated with the metric of interest,
      determining, by the MLM, the at least one entity and the associated value causing a deviation in a trend of values that exceeds a threshold associated with the detection in the deviation of the trend, and
      adding data indicative of the at least one entity and the associated value of the at least one entity to a report generated by the computer processing system indicative of the detection of the anomaly in the metric of interest;
   determining, by the computer processing system, that the entity and the associated value are used to configure a service of the distributed service system of the computer processing system;
   configuring, by the computer processing system, execution of a service of the distributed service system of the computer processing system using the entity and the associated value by adjusting the associated value of the entity at the service of the distributed service system to be consistent with the trend of values, the adjustment of the associated value that configures the execution of the service added to the report; and
   transmitting, by the computer processing system, the report to a second computer processing system associated with the user.

2. The method of claim 1, wherein the method further comprises:
   detecting, by the MLM, when there is no anomaly in any metric of interest in the set of metrics of interest; and
   adding data indicative of no anomaly being detected to the report prior to transmission to the second computer processing systems.

3. The method of claim 1, wherein the report comprises a dashboard user interface rendered on a display screen of the second computer processing system.

4. The method of claim 1, further comprising:
   periodically accessing, by the computer processing system, service system data generated by the services of the distributed service system for plurality of users of the distributed services system; and
   disambiguating, by the computer processing system, the service system data into the one or more values associated with one or more corresponding common entities in the data store of disambiguated service system data.

5. The method of claim 4, wherein the disambiguating comprises:
   parsing, by the computer processing system, the service system data to extract data descriptors and associated values from within the service system data that are associated a set of metrics including the metrics of interest;
   for each of the extracted data descriptors, translating, by the computer processing system, a data descriptor to a common entity, wherein the associated value of the data descriptor is further associated with the common entity to which the data descriptor is translated to; and
   storing, by the computer processing system, the common entity and values associated with the common entities in the data store of disambiguated service system data.

6. The method of claim 4, wherein the machine learning model trained to detect an effect of the one or more values associated with the one or more corresponding common entities on the set of metrics of interest further comprises:
   access the data store of disambiguated service system data to obtain values associated the common entities;
   iteratively inputting sets of values for sets of common entities into the MLM during a training phase of the MLM, the training phase to enable the MLM to detect relationships between the sets of common entities and the set of metrics of interest.

7. The method of claim 6, wherein the relationships between the sets of common entities and the set of metrics of interest comprises a cohort level relationship where values of the set of metrics of interest used by the MLM for anomaly detection of metrics of interest are based on service system data generated by users of the commerce platform system having a similar size, similar location, similar business, or a combination thereof.

8. The method of claim 4, wherein the relationships between the sets of common entities and the set of metrics of interest comprises a trend based variation in values of one or more of the metrics of interest in the set of metrics of interest over a period of time.

9. The method of claim 1, wherein the computer processing system comprises a commerce platform system, and the distributed service system implements the services of the commerce platform system.

10. A non-transitory computer readable storage medium including instructions that, when executed by a processor, cause the processor to perform operations for leveraging a distributed services system for surfacing insights for a user, the operations comprising:
   accessing, by a computer processing system, service system data generated for a user by services of a distributed service system of the computer processing system, the service system data comprising one or more values associated with one or more corresponding common entities in a data store of disambiguated service system data;

inputting the one or more values associated with the one or more corresponding common entities generated for the user into a trained machine learning model (MLM), the MLM trained to detect an effect of the one or more values associated with the one or more corresponding common entities on a set of metrics of interest;

detecting, by the MLM, when there is an anomaly in a metric of interest in the set of metrics of interest comprising:

identifying, by the computer processing system, at least one entity and an associated value of the at least one entity determined by the MLM to cause the anomaly in the metric of interest, detecting, by the MLM, a deviation in a trend of values associated with the metric of interest, determining, by the MLM, the at least one entity and the associated value causing a deviation in a trend of values that exceeds a threshold associated with the detection in the deviation of the trend, and adding data indicative of the at least one entity and the associated value of the at least one entity to a report generated by the computer processing system indicative of the detection of the anomaly in the metric of interest;

determining, by the computer processing system, that the entity and the associated value are used to configure a service of the distributed service system of the computer processing system;

configuring, by the computer processing system, execution of a service of the distributed service system of the computer processing system using the entity and the associated value by adjusting the associated value of the entity at the service of the distributed services system to be consistent with the trend of values, the adjustment of the associated value that configures the execution of the service added to the report; and transmitting, by the computer processing system, the report to a second computer processing system associated with the user.

11. The non-transitory computer readable storage medium of claim 10, wherein the operations further comprise:

detecting, by the MLM, when there is no anomaly in any metric of interest in the set of metrics of interest; and adding data indicative of no anomaly being detected to the report prior to transmission to the second computer processing systems.

12. The non-transitory computer readable storage medium of claim 10, wherein the report comprises a dashboard user interface rendered on a display screen of the second computer processing system.

13. The non-transitory computer readable storage medium of claim 10, the operations further comprising:

periodically accessing, by the computer processing system, service system data generated by the services of the distributed service system for plurality of users of the distributed services system; and disambiguating, by the computer processing system, the service system data into the one or more values associated with one or more corresponding common entities in the data store of disambiguated service system data.

14. The non-transitory computer readable storage medium of claim 13, wherein the operations for disambiguating further comprise:

parsing, by the computer processing system, the service system data to extract data descriptors and associated values from within the service system data that are associated a set of metrics including the metrics of interest;

for each of the extracted data descriptors, translating, by the computer processing system, a data descriptor to a common entity, wherein the associated value of the data descriptor is further associated with the common entity to which the data descriptor is translated to; and storing, by the computer processing system, the common entity and values associated with the common entities in the data store of disambiguated service system data.

15. The non-transitory computer readable storage medium of claim 13, wherein the machine learning model trained to detect an effect of the one or more values associated with the one or more corresponding common entities on the set of metrics of interest further comprises:

access the data store of disambiguated service system data to obtain values associated the common entities;

iteratively inputting sets of values for sets of common entities into the MLM during a training phase of the MLM, the training phase to enable the MLM to detect relationships between the sets of common entities and the set of metrics of interest.

16. The non-transitory computer readable storage medium of claim 15, wherein the relationships between the sets of common entities and the set of metrics of interest comprises a cohort level relationship where values of the set of metrics of interest used by the MLM for anomaly detection of metrics of interest are based on service system data generated by users of the commerce platform system having a similar size, similar location, similar business, or a combination thereof.

17. The non-transitory computer readable storage medium of claim 13, wherein the relationships between the sets of common entities and the set of metrics of interest comprises a trend based variation in values of one or more of the metrics of interest in the set of metrics of interest over a period of time.

18. The non-transitory computer readable storage medium of claim 10, wherein the computer processing system comprises a commerce platform system, and the distributed service system implements the services of the commerce platform system.

19. A system for leveraging a distributed services system for surfacing insights for a user, the system comprising:

a memory; and at least one processor coupled with the memory configured to:

access service system data generated for a user by services of a distributed service system, the service system data comprising one or more values associated with one or more corresponding common entities in a data store of disambiguated service system data, input the one or more values associated with the one or more corresponding common entities generated for the user into a trained machine learning model (MLM), the MLM trained to detect an effect of the one or more values associated with the one or more corresponding common entities on a set of metrics of interest, detect, by the MLM, when there is an anomaly in a metric of interest in the set of metrics of interest, comprising the processor further configured to:

identify, by the computer processing system, at least one entity and an associated value of the at least one entity determined by the MLM to cause the anomaly in the metric of interest, detect, by the MLM, a deviation in a trend of values associated with the metric of interest, determine, by the MLM, the at least one entity and the associated value causing a deviation in a trend of values that exceeds a threshold associated with the detection in the deviation of the trend, and add data indicative of the at least one entity and the associated value of the at least one entity to a report generated by the computer processing system indicative of the detection of the anomaly in the metric of interest, determine, by the computer processing system, that the entity and the associated value are used to configure a service of the distributed service system of the computer processing system, configure, by the computer processing system, execution of a service of the distributed service system of the computer processing system using the entity and the associated value by adjusting the associated value of the entity at the service of the distributed services system to be consistent with the trend of values, the adjustment of the associated value that configures the execution of the service added to the report, and transmit the report to a second computer processing system associated with the user.

* * * * *